United States Patent [19]

Gamondes

[11] 4,377,952

[45] Mar. 29, 1983

[54] PEDAL BLOCK FOR A CYCLE SHOE

[75] Inventor: Claude Gamondes, St. Jean de la Ruelle, France

[73] Assignee: Sarragan S.A., Fribourg, Switzerland

[21] Appl. No.: 185,009

[22] Filed: Sep. 8, 1980

[30] Foreign Application Priority Data

Sep. 10, 1979 [FR] France .................. 79 22562

[51] Int. Cl.³ ........................... G05G 1/14
[52] U.S. Cl. ..................... 74/594.6; 36/131
[58] Field of Search .................. 74/594.6; 36/131

[56] References Cited

U.S. PATENT DOCUMENTS

| 550,409 | 11/1895 | Hanson | 36/131 X |
| 587,335 | 8/1897 | Shephard | 74/594.6 |
| 598,325 | 2/1898 | McIntyre | 74/594.6 |
| 614,900 | 11/1898 | Seaver et al. | 74/594.6 X |
| 3,964,343 | 6/1976 | Lauterbach | 74/594.6 |

FOREIGN PATENT DOCUMENTS

WO80/01056 5/1980 PCT Int'l Appl. .

Primary Examiner—Philip C. Kannan
Attorney, Agent, or Firm—Brisebois & Kruger

[57] ABSTRACT

An intermediate piece and an external piece are clamped to a base on the bottom of a shoe, by a screw. The screw extends into a captive nut which can slide in the base and cooperating teeth on the intermediate piece and the base provide for longitudinal adjustment of the intermediate piece and external piece relative to the base. Radial teeth on the intermediate piece and the external piece permit angular adjustment of the external piece with respect to the base and intermediate piece. A pedal engaging projection on the external piece can thus be adjusted both angularly and longitudinally and can be locked in the adjusted position. The base can be an integral part of the sole of a cycle shoe.

12 Claims, 6 Drawing Figures

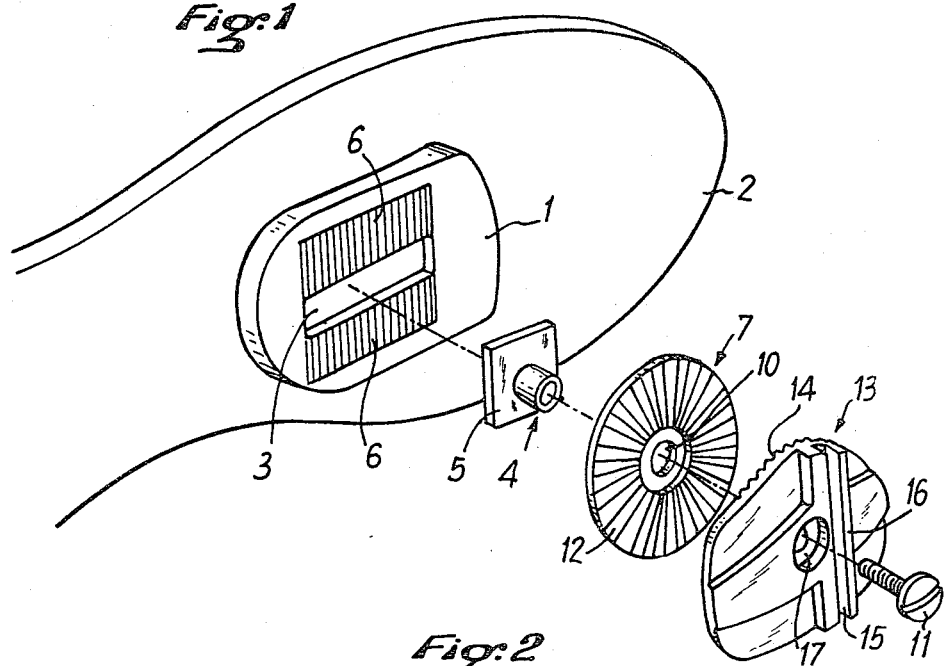
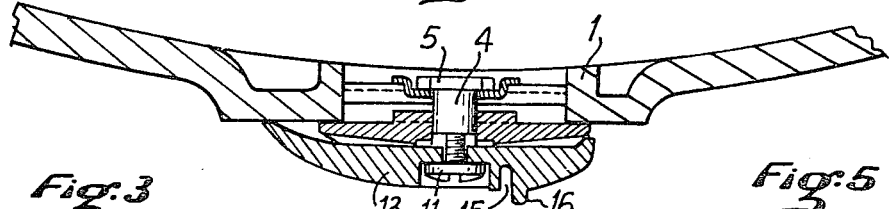
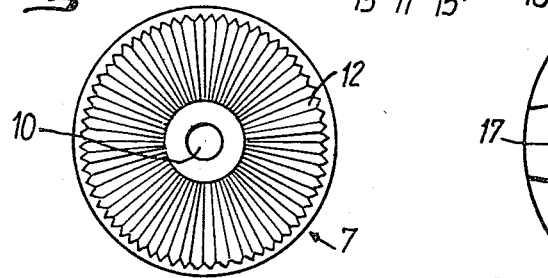
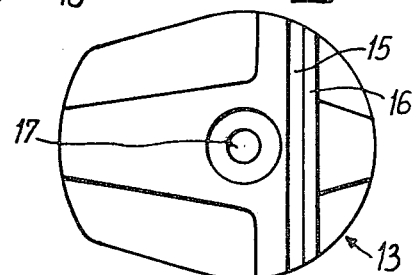
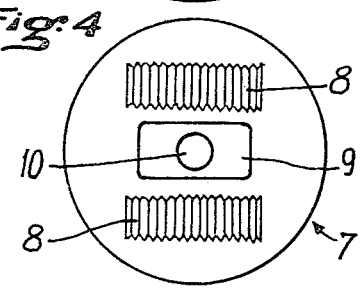
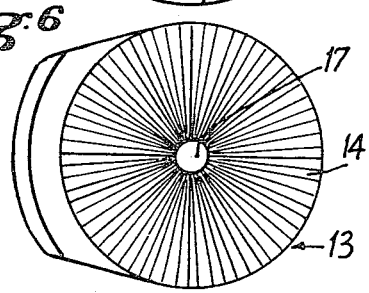

PEDAL BLOCK FOR A CYCLE SHOE

The present invention relates to a pedal chock device for a cycle shoe.

There are currently in use for the practice of cycling, particularly competitive cycling, devices called pedal chocks or blocks which can be fixed under the sole of a shoe and which permit, during use, maintaining a predetermined position of the shoe with respect to the pedal. This insures much greater uniformity of pedaling.

The known pedal chock devices are usually made of thin plates, most often of a plastic material, which can be fastened, usually by nailing, by means of a sufficient number of tacks or nails on the lower face of the sole. These thin plates usually have a locating recess which engages over a rib or blade of the pedal.

The known devices, although currently used, are not really satisfactory insofar as they are relatively difficult to mount because of the great number of tacks necessary for fastening them to the sole. In addition, once the pedal chock has been mounted, it is not possible to adjust or change the position, without unnailing the pedal chock and renailing it in the new position.

The present invention proposes to provide by way of a new industrial product, a pedal chock for a cycle shoe, simple and economical in design, which allows, in a particularly easy manner, the changing at will of the longitudinal position as well as the angular position of the shoe with respect to the pedal.

The pedal chock device according to the present invention is characterized essentially by the fact that it includes a base piece, connected to the lower face of the sole of the shoe, preferably formed as a single piece with it, an intermediate part movable longitudinally with respect to the base piece, and an outside piece rotationally movable with respect to the intermediate part and capable of displacement longitudinally with the intermediate part, relative to the base piece, the exterior piece having on its outside face means for locating or seating on a pedal, preferably in the form of at least one recess in which a rib of the pedal of the bicycle can engage, the device also having cooperating engaging means, on each of the faces of the intermediate part and the opposing faces of the base piece and the exterior piece, and defining a plurality of positions of longitudinal adjustment of the intermediate part with respect to the base piece, and a plurality of positions of angular adjustment of the exterior piece with respect to the intermediate part, and a single locking means operable from the outside to immobilize the pieces with respect to each other for each of the defined adjustment positions.

In one particular embodiment the locking device comprises a threaded screw, whose head can be manipulated from the outside, for example by means of a coin, a screwdriver, or a key, and which extends through aligned openings of the exterior piece and the intermediate part, the base piece having a longitudinal slot or recess from which extends a threaded socket, captive within the base piece and able to slide in the recess, and into which socket the threaded bolt is screwed.

In one particularly preferred embodiment of the invention the means for engagement with the intermediate part and the base piece include at least one set of transverse parallel coooperating teeth made in the outside face of the base piece and the facing surface of the intermediate part. Advantageously, there are two sets of parallel teeth on the base piece on either side of the longitudinal recess, the facing surface of the intermediate piece having two corresponding sets of teeth formed on either side of a longitudinal central projection capable of sliding in the said recess of the base piece, and in which is made the opening for the passage of the locking means.

Advantageously, the means of engagement of the intermediate part and the exterior piece have a number of teeth made in the facing surfaces of the pieces, and extending radially from the openings made in the pieces for the passage of the locking means. Advantageously, the intermediate part takes the form of a circular disc. The different pieces of the pedal chock according to the invention may be made of any appropriate material, particularly a synthetic material such as a polyamide.

It will be understood that the device according to the invention can be very simply adjusted from the outside, especially when the locking means is a threaded screw whose head has a slot which may be manipulated by means of a coin or a screwdriver. It is sufficient for the user to loosen the threaded screw which, without taking apart the constituent pieces of the pedal block, disengages them from each other allowing the user to choose a longitudinal adjustment position by displacing longitudinally the assembly of the intermediate part and the exterior piece with respect to the base piece and an angular adjustment position by changing the rotational position of the exterior piece with respect to the intermediate part. Then it is sufficient for the user to tighten the threaded screw to immobilize the different pieces in the new adjusted position. Thus, the recess of the outside surface of the exterior piece is located precisely in the chosen position with respect to the shoe. This adjusting operation can be easily carried out at any time, the user even being able to do so without having to dismount from his bicycle which may be particularly useful during a race.

In order to make the invention better understood, there will now be described by way of nonlimiting example one embodiment referring to the attached drawings in which:

FIG. 1 shows in exploded perspective the device according to the invention and the sole of a cycle shoe;

FIG. 2 shows in section the device according to the invention in place on a sole of a cycle shoe;

FIGS. 3 and 4 show upper and lower views respectively of the intermediate part of the device of FIG. 1; and FIGS. 5 and 6 are upper and lower views respectively of the outside piece of the device according to FIG. 1.

The pedal chock according to the invention includes a base piece 1 fixed to the sole 2 of a cycle shoe, and preferably made in one piece with the sole during manufacture of the sole, but the base piece 1 could, however, be a separate piece fixed to the sole by any appropriate means.

This base piece 1 has a longitudinal recess 3 and receives a threaded socket 4 which has a support surface 5, for example square, by which it can be captively mounted inside the base piece 1 so that the threaded portion of the socket projects outwardly of the recess 3, the threaded socket 4 being slidable longitudinally with respect to the base piece 1.

The base piece 1 also has two parallel sets of transverse teeth 6 disposed on either side of recess 3, these teeth 6 preferably each having a V-shaped section.

The device according to the invention includes an intermediate part 7 in the form of a ciruclar disc which is best seen on FIGS. 3 and 4. On its surface which faces toward the base piece, the intermediate part 7 has two parallel rows of teeth 8 identical to teeth 6 of the base piece and capable of engaging with them. On the same face, intermediate part 7 has a projection 9 whose width is slightly less than that of longitudinal recess 3 of the base piece to allow it to slide inside this latter.

The intermediate part also has a central opening 10 for the passage of a locking means such as a threaded screw 11 designed to be screwed into the threaded socket 4 held captive in base piece 1.

On its opposite surface the intermediate part has a number of radial teeth 12, also of V-shaped section.

Finally, the device according to the invention has an exterior piece 13 which may be best seen in FIGS. 5 and 6.

This piece 13 has on its surface which faces toward the intermediate part 7, a number of radial teeth 14 identical to teeth 12 of the intermediate part 7 and capable of engagement with them.

On its outside surface the exterior piece 13 has means for positioning on a bicycle pedal, particularly a recess 15 and a rib 16. By means of this recess 15 the shoe can be seated on a rib or blade of the pedal, rib 16 serving as a frontal abutment.

The external face of the exterior piece is also contoured as is best shown on FIG. 2.

Finally, the exterior piece 13 has a central opening 17 for the passage of the threaded screw 11.

As was indicated above, the mounting of the pedal block according to the invention and its adjustment are accomplished by assembling the different constituent pieces and locking the assembly by means of the threaded screw passing through the exterior piece and the intermediate piece and being screwed in the threaded socket captively within the base piece.

Although the invention has been described in connection with one particular embodiment it is of course evident that it is in no way thereby limited and that it can undergo numerous modifications without exceeding either its scope or its spirit.

I claim:

1. Pedal chock for a cycle shoe comprising: a base on the bottom of the shoe, an intermediate piece longitudinally movable with respect to said base, and an external piece rotatable with respect to the intermediate piece and displaceable longitudinally with said intermediate piece relative to the base, said intermediate piece being between said base and said external piece, said external piece having an outside face comprising locating means for locating on a pedal of a bicycle, cooperating means on said base and said intermediate piece for engagement with each other at a plurality of positions of longitudinal adjustment of the intermediate piece with respect to the base, cooperating means on said intermediate piece and said external piece for engagement with each other at a plurality of positions of angular adjustment of the external piece with respect to the intermediate piece, and locking means for immobilizing said pieces with respect to each other and with respect to said base on each of said positions of adjustment.

2. Pedal chock according to claim 1, wherein said locking means comprises a threaded screw extending through aligned openings of the exterior piece having a longitudinal recess from which extends a threaded socket captively retained by said base piece and slidable in said recess, said threaded screw being threaded into said threaded socket and having a head exposed with respect to the chock for tightening thereof to immobilize said pieces, by clamping said intermediate piece between said external piece and said base.

3. Pedal chock according to claim 1 wherein said cooperating means on the intermediate piece and the base comprises, at least one set of parallel transverse teeth on said base and cooperating teeth on a surface of the intermediate piece which faces toward the base.

4. Pedal chock according to claim 3 wherein said base has a longitudinal recess and two sets of parallel teeth on either side of said longitudinal recess, said intermediate piece having, on said surface which faces toward said base, two corresponding sets of teeth on either side of a central longitudinally elongated projection, said projection extending into and being slideable in said recess of the base.

5. Pedal chock according to claim 4 wherein said recess and said projection each have parallel sides.

6. Pedal chock according to claim 1, wherein said cooperating means on the intermediate piece and the external piece comprise a plurality of teeth on each piece and extending radially from a central portion of said pieces.

7. Pedal chock according to claim 1 wherein said intermediate piece comprises a circular disc.

8. Pedal chock according to claim 1 wherein said locating means comprises at least one recess in said outside face of said external piece for seating on a rib of a pedal of a bicycle.

9. Footwear for cycling comprising a pedal chock according to claim 1.

10. Footwear for cycling comprising a pedal chock according to claim 3.

11. Footwear for cycling comprising a pedal chock according to claim 4.

12. Footwear for cycling comprising a pedal chock according to claim 8.

* * * * *